United States Patent [19]

Fox et al.

[11] Patent Number: 4,835,043

[45] Date of Patent: * May 30, 1989

[54] SULFITE-OXIDE PROCESS FOR SCAVENGING HYDROGEN SULFIDE

[76] Inventors: Irwin Fox, 37 Meadowbrook Country Club Estates, Ballwin, Mo. 63011; Alvin Samuels, 444 Fairway Dr., New Orleans, La. 70124

[*] Notice: The portion of the term of this patent subsequent to Jan. 6, 2004 has been disclaimed.

[21] Appl. No.: 928,788

[22] Filed: Nov. 10, 1986

Related U.S. Application Data

[63] Continuation-in-part of Ser. No. 710,132, Mar. 11, 1985, Pat. No. 4,634,539, and a continuation-in-part of Ser. No. 818,282, Jan. 13, 1986, abandoned.

[51] Int. Cl.$^4$ .................. C01B 17/16; C01B 31/20
[52] U.S. Cl. .................................. 423/222; 423/225; 423/231
[58] Field of Search ................. 423/222, 225, 231

[56] References Cited

U.S. PATENT DOCUMENTS

| | | | |
|---|---|---|---|
| 4,146,569 | 3/1979 | Giammarco et al. | 423/222 |
| 4,246,244 | 1/1981 | Fox | 423/225 |
| 4,310,497 | 1/1982 | Deschamps et al. | 423/231 |
| 4,634,539 | 1/1987 | Fox et al. | 423/222 |

*Primary Examiner*—John Doll
*Assistant Examiner*—Lori S. Freeman
*Attorney, Agent, or Firm*—Jerome A. Gross

[57] ABSTRACT

Adding sodium sulfite in the slurry of the iron oxide slurry process for scavenging hydrogen sulfide described in U.S. Pat. No. 4,246,244, eliminates excessive foaming on start-up, stabilizes the suspension of the oxide particles in the slurry, lessens clogging of reacted particles, which otherwise interferes with cleaning out the reactor vessel, and so materially buffers the slurry as to minimize corrosion of the reactor vessel and piping. Further, adding small amounts of oxygen to the gas stream, which would be expected to cause corrosion, does not do so; instead it prolongs the usefulness of the reactant oxide particles and affords increased acid-stability to the reaction products.

6 Claims, No Drawings

SULFITE-OXIDE PROCESS FOR SCAVENGING HYDROGEN SULFIDE

CROSS-REFERENCE TO RELATED APPLICATIONS

This application is a continuation-in-part of Application Ser. No. 06/710,132 filed Mar. 11, 1985, U.S. Pat. No. 4,634,539 entitled "Scavenging Oxygen from Aqueous Systems", now allowed, and of Application Ser. No. 06/818,262 filed Jan. 13, 1986, entitled "Improved Process for Scavenging Hydrogen Sulfide from Hydrocarbon Gases", now abandoned.

BACKGROND OF THE INVENTION

1. Field of the Invention

This invention relates to removal of hydrogen sulfide from hydrocarbon gases from gas wells, for delivery to pipe lines.

2. Related Art

The basic process for removing hydrogen sulfide from hydrocarbon gas by bubbling it through an aqueous slurry of iron oxide particles is described in U.S. Pat. No. 4,246,244 issued Jan. 20, 1981 (hereinafter referred to as the "244" patent). In this process, the reaction of the hydrogen sulfide with the special oxide particles there described results in formation of substantially stable reaction products, principally $FeS_2$, $S°$ and other forms of iron sulfide. One of these reactive products, FeS, though stable when dry, may, when wet, regenerate $H_2S$ in the atmosphere.

A problem of the patented process which may cause difficulty is excessive foaming of a slurry when first used; this foaming may be so great as temporarily to cause the reactor vessel to overflow. Another is settling of the oxide particles out of suspension if the rate of inflow of gas is reduced; another, caking of the reacted particles so as to clog the packing in the reactor vessel and make slurry change-outs difficult. There is concern for corrosion of steel reactor vessels and piping; and the phenomena, not heretofore understood, of gradual increase of the level of $H_2S$ in the outlet gas, even though an adequate quantity of unreacted oxide particles remain. Permissible $H_2S$ limits in outlet gas are set by regulatory authorities; in some states it may have no more than 4 ppm hydrogen sulfide. In practicing the "244" patented process, it was found that the outlet gas level would gradually rise as the particles were partly reacted, to reach the legal maximum when and although more than half the reactive capacity of the particles remained unused.

SUMMARY OF THE INVENTION

According to the presently improved process, a sulfite is added to the "244" patented slurry system with several unexpected favorable results. Included are these: excessive foaming of a slurry batch on start-up is overcome; also the suspension of the oxide particles in the slurry is stabilized so that even a fairly substantial reduction in the rate of inflowing gas will not cause the particles to precipitate; further, the oxide particles when reacted do not cake together, to interfere with the clean-out of the slurry vessel. More significantly, corrosion of the reactor vessel and piping is virtually overcome.

If, in addition to adding the sulfite, small amounts of oxygen are injected into the inflowing gas stream, still further advantages are achieved. Because of fear of oxygen corrosion, a person familiar with the subject matter would reject the idea of intentionally introducing oxygen; yet with the sulfite additive, the use of small amounts of oxygen, as herein described, has not in fact resulted in corrosion. To the contrary, such use of oxygen may actually lessen corrosion and in any event, has resulted in substantial increase, by two-thirds according to some tests, in utilization of the reactive capacity of the oxide particles before the level of the $H_2S$ in the outlet gas exceeds a regulatory limit. Further, the reaction products on clean-out are found to consist of the more stable compounds $FeS_2$ and $Fe_3S_4$, while significantly lacking FeS.

It is theorized that, with the original "244" process, progressive accumulation of FeS in the slurry might so regenerate hydrogen sulfide as to raise the $H_2S$ outlet level; but such accumulation is prevented by the reaction of FeS in the slurry with air and unreacted hydrogen sulfide, to yield stable $FeS_2$ and $Fe_3S_4$.

DESCRIPTION OF THE PREFERRED EMBODIMENT

The present process is based on that of said U.S. Pat. No. 4,246,244 issued Jan. 20, 1981, which is hereby incorporated by reference. That patented process utilizes iron oxide particles having an $Fe+++$ content intermediate that for pure standards of $Fe_2O_3$ and $Fe_3O_4$, in which the excess of iron in the $Fe+++$ valence state appears to be present as an amorphous $Fe_2O_3$. The particles have an equivalent surface area of at least 4 square meters per gram. Those particles, identified as "A" in that patent, are commercially available at the time of filing this application under the trademark "Slurrisweet", distributed by Gas Sweetener Associates, New Orleans, La.

A water suspension or slurry is made up using a charge of such particles, of preferably from about 80 to 120 pounds per barrel, in a reactor vessel such as a scrubbing column, static mixer, bubble vessel or the like, in which the natural gas containing hydrogen sulfide to be scavenged is bubbled through the slurry. Apparatus thought most advantageously used for this purpose may be that shown in U.S. Pat. No. 4,405,563, whose disclosure is hereby incorporated by reference.

In the presently improved process, a buffering additive including a sulfite, preferably sodium sulfite, is added to the make-up of the slurry; this also serves to avoid excess foaming on start-up. At present it appears that the quantity of sodium sulfite should be maintained throughout the reaction of the slurry batch at three or more pounds per barrel of the slurry, but in any event at least one pound per barrel. Because the sulfite level appears to drop during the reaction, it will be found convenient before start-up to mix in a substantially larger quantity, for example, as much as 20 pounds per barrel.

Commercially available concentrated silicon defoamer may be conventionally added to the slurry. If such a defoamer was used without the sulfite, it would ordinarily be necessary to re-add it to a slurry batch from time to time as the process continued. We have found that using the sodium sulfite of the present invention, no further additions of such silicon defoamer to the slurry batch will be required.

Without the sulfite additive, the specified iron oxide particles tend to aggregate or clump together, the clumping increasing as their reaction proceeds. Such aggregation may cause the particles to fall out of suspension on any decrease in the gas inflow rate. The sulfite additive here described has proved to keep the particles separate; they therefore remain in suspension even though some fairly substantial decrease occurs in rate of gas inflow into the reactor vessel.

After the oxide particles have been reacted and the reactor vessel is to be cleaned out and re-charged, it was found in the original process that the reacted oxide particles would substantially cake together, in some instances so severely as to clog the packer material in the reactor vessel. In contrast, using the present sulfite additive, the reacted particles stay separate and discrete, and are readily handled on change-out.

Reacting the oxide particles with hydrogen sulfide according to the "244" patent predictably lowers the pH of the slurry. Carbon dioxide, normally present in natural gas, is known to further lower the pH. The present sulfite additive, whether sodium sulfite alone or sodium bisulfite with caustic added to create the sulfite buffer, has proved to avoid this anticipated reduction in slurry pH. Two important favorable results have followed: by maintaining a favorably high pH throughout the reaction, corrosion of the reactor vessel components and piping is minimized; and the outlet level of hydrogen sulfide is decreased according to Henry's law.

Whenever, as here, corrosion is a matter of concern, conventional knowledge would forbid the introduction of oxygen into the inflowing gas stream, because of the known corrosive effect of oxygen alone. However, with the sulfite additive, there has been no oxygen corrosion; in fact, the corrosion problem appears to have been lessened substantially by injecting small quantities of air. While carefully controlled air injection might be made continuously into the inflowing gas stream, such injections are more conveniently made intermittently. We have found that the intervals may be as great as $3\frac{1}{2}$ hours, but preferably are no longer than 30 minutes. The quantity of air to be so injected may typically be about one cubic foot of air for each 200 cubic feet of gas to be treated, or stated differently, one cubic foot of oxygen for each 1,000 cubic feet of gas to be sweetened. These are merely rough guide lines.

The introduction of air appears to have at least these three favorable consequences: without any increase (and probably some decrease) in corrosion of the reactor vessel, the level in the outlet gas of hydrogen sulfide is kept below the regulatory limit for a longer period of time, lessening interruptions for clean-out and replacement of a slurry batch and utilizing a substantially greater part of the reactive capacity of the oxide particles; and the reaction products at clean-out are almost entirely lacking in FeS, instead being principally $Fe_3S_4$ and $FeS_2$, which are acid stable in the atmosphere even when wet.

These phenomena are thought to be related, according to the following hypothesis. Without added air, FeS is formed as one of the products of reaction between the oxide particles and the hydrogen sulfide in the inflowing gas. The amount of FeS so formed may initially be fairly small, but as the reaction continues, corrosive FeS accumulates when its capacity for regenerating hydrogen sulfide becomes a substantial factor; this may serve to increase the level of the $H_2S$ in the outlet gas.

Laboratory tests of the oxide particles to determine their capacity to react hydrogen sulfide, made without regard to hydrogen sulfide outlet levels, indicate that each pound of the special oxide particles has the capacity to react 0.7 pounds of hydrogen sulfide. Without the injection of air, the 4 ppm level of hydrogen sulfide in the outlet gas may be reached when only 0.24 pounds of hydrogen sulfide has been reacted per pound of particles. Similar tests with air injection indicate that reaching 4 ppm limit will be delayed until the oxide particles have reacted approximately 0.40 pounds of hydrogen sulfide per each pound of the particles, about a two-thirds increase in utilization of the particles.

That the use of small quantities of air could have such favorable results was not to have been anticipated.

EXAMPLE I—OVERCOMING FOAMING

Complex laboratory tests show the slurry foam problem is caused by reaction of hydrogen sulfide at the oxide particle surface. Field tests made with hydrogen sulfide in the gas stream were contrasted with laboratory tests in which nitrogen was substituted for the hydrogen sulfide.

Those field tests made without the present sulfite additive showed that severe foaming would occur on start-up and continue until about 10% of the reaction had occurred. Identifying the problem as one of surface effects, these surface effects were changed by the introduction of sodium sulfite in the amount of 2 to 10 pounds per barrel and 600 ppm of concentrated silicon type defoamer into the initial slurry. This additive combination completely eliminated foam in the laboratory test. The same result was achieved in the field operation. With the new additive blend in a fresh oxide slurry batch the production rate could now be increased to the full capacity in less than 10 minutes without fear of a carryover. The need for a gradual rate increase (and accompanying production loss) was no longer required.

This effect of sodium sulfite on the slurry surface chemistry is totally unexpected. Conventional defoamer additives are usually large organic or silicon-based molecules which tend to reduce dramatically surface tension when added in small amounts to aqueous liquids. The sodium sulfite additive is inorganic, and must be added in relatively large quantities to achieve the desired effect. A possible reason for its action may be related to its ability to maintain reactor slurry at a relatively high pH between 6 and 8, throughout the reaction process. In contrast, without sulfite additive, the slurry pH will be between 4 and 5.

EXAMPLE II—PARTICLES REMAIN IN SUSPENSION

The sodium sulfite additive provides a more complete dispersion (separation) of the oxide particles, resulting in smaller average suspended particle size and slower settlement rates. This improved quality can be seen in the following lab tests comparison of slurry samples from field reactors. In each sample the iron oxide loading was equivalent to 100 pounds per barrel. The two slurry samples of 100 ml each were placed into graduated cylinders and agitated into a complete suspension state. The black oxide then began to settle, leaving clear water in the upper column. The volume of oxide which settled to bottom is noted below:

| TIME | SAMPLE 'A' (W/O ADDITIVE) | SAMPLE 'B' (W/ ADDITIVE) |
| --- | --- | --- |
| Settled oxide after 1 hour | 15 ml | 55 ml |
| Settled oxide | 15 ml | 35 ml |

| TIME | SAMPLE 'A' (W/O ADDITIVE) | SAMPLE 'B' (W/ ADDITIVE) |
|---|---|---|
| after 24 hours | | |

EXAMPLE III—REDUCED CORROSION

Tests were performed on field samples using corrosions coupons to determine the corrosion rates without either sulfite or added air as in the original patented process, as well as with sulfite but without air, and with both. The sulfite utilized was sodium sulfite.

| Well Site | Process Modification | pH of Field Sample | Corrosion Rate mils/yr |
|---|---|---|---|
| McConnell (Michigan) | no air, no sulfite | 5–6 | 1080 |
| Van Pelt (Michigan) | no air, .8# sulfite/bbl. | 6.4 | 832 |
| Van Pelt (Michigan) | no air, 4# sulfite/bbl. | 8.0 | 30–100 |
| O'Byrne (Texas) | air, 3# sulfite/bbl. | 7.5 | 37 |

These data indicate that by adding sodium sulfite to the slurry mixture, a higher pH and lower corrosion rate results. It appears that the favorable effect of adding sodium sulfite commences at approximately 1 lb. per barrel, but is more significant when added at 3 lbs. per barrel or more.

EXAMPLE IV—INCREASED UTILIZATION OF REACTIVE CAPACITY

Comparative field tests were made between the originally patented process and the presently improved process as follows:

The O'Byrne Well (Texas)

The purpose was to determine how much more hydrogen sulfide could be removed, by addition of air, before exceeding the 4 ppm maximum allowable level of hydrogen sulfide in the outlet gas. Results were as follows:

| Slurry Process | No. of Runs | Average H₂S Removed Per Run, lbs. | Average Amount of O₂ Added Per Run, lbs. |
|---|---|---|---|
| Original | 15 | 1140 | 0 |
| Improved | 10 | 1794 | 20 |

Interpreting the foregoing, without air injection an average of 1140 lbs. hydrogen sulfide were removed, but with twenty pounds of oxygen added, 1794 lbs. were removed; thus each pound of added oxygen was accompanied by removal of about 33 more pounds of hydrogen sulfide. More significantly, these tests show an increase of roughly 57% in utilization of the reactive capacity of the iron oxide particles. Other tests indicate an approximate two-thirds increase in use of their reactor capacity.

The mechanism for this unexpected and very significant additional amount of H₂S removed is not simply a direct reaction between 654 lbs. of H₂S and 20 lbs. of O₂ in the presence of iron oxide. If such a direct stoichiometric reaction were to occur it would have produced either elemental sulfur, S, or sulfur dioxide, SO₂:

$$2H_2S + O_2 \rightarrow 2S + 2H_2O \quad (1)$$

$$2H_2S + 3O_2 \rightarrow 2SO_2 + 2H_2O \quad (2)$$

According to reaction 1, 20 lbs. of $O_2$ would remove only about 42.5 lbs. of $H_2S$; according to reaction 2, 20 lbs. of $O_2$ would remove only about 14.2 lbs. of $H_2S$. In either case the amount of $H_2S$ that might be so directly reacted out by $O_2$ is far less than the observed amount removed, 654 lbs. This is a convincing demonstration that the small amount of oxygen instead serves to permit the reaction of hydrogen sulfide with the preliminary reaction product FeS, as discussed hereafter.

The Van Pelt Well Site (Michigan)

The process with air injection into a single slurry batch was carried out for thirteen days until injected air no longer reduced the hydrogen sulfide content in the outlet gas below the 16 ppm limit in Michigan. Test results are shown below:

| Day | Gas Flow Standard Cubic Feet/Day | Air Injections Per Hour | CU/Ft of Air Per Injection | H₂S Content of Scavenged Gas |
|---|---|---|---|---|
| 1 | 200,000 | 17.6 | 2.44 | 1.5 ppm |
| 2 | 240,000 | 8.8 | 2.5 | 2.4 ppm |
| 3 | 220,000 | 8.8 | 2.5 | 3.0 ppm |
| 4 | 270,000 | 35 | 2.46 | 2.0 ppm |
| 5 | 235,000 | 35 | 2.46 | 1.5 ppm |
| 6 | 235,000 | 17.6 | 2.44 | 1.0 ppm |
| 7 | 235,000 | 24 | 2.46 | 1.5 ppm |
| 8 | 300,000 | 24 | 2.46 | 0.3 ppm |
| 9 | 220,000 | 24 | 2.46 | 1.0 ppm |
| 10 | 250,000 | 24 | 2.46 | 1.0 ppm |
| 11 | 240,000 | 24 | 2.46 | 4.0 ppm |
| 12 | 300,000 | 40 | 2.45 | 9.0 ppm |
| 13 | — | | | 16.0 |
| Total | 2,945,000 | Shut Down | | |

This test data demonstrates that until the twelfth day of use of a slurry batch, intermittent injections of air served repeatedly to reduce the level of hydrogen sulfide in the outlet gas.

Laboratory tests using nitrogen instead of natural gas likewise demonstrate how an impermissibly high outlet level of hydrogen sulfide may be repeatedly reduced by intermittent injections of air. A vertically arranged pyre reactor having an inner diameter of 2 inches and a height of 18 feet, and equipped with pall rings and sieve plates to improve dispersion was used. A slurry of 1400 grams of iron oxide A particles (same as described in Example I) in 5 liters of water was put into the reactor and nitrogen gas at a pressure of 20 psig and containing H₂S was bubbled up through the slurry at a flow rate of about 0.102 cubic feet minute. The concentration of H₂S in the gas emerging from the reactor was measured in the course of the experiment. The results are given in the following table:

| Elapsed Time (Minutes) | Feed Stock ppm of H₂S in Nitrogen | Time After Air Injection (Minutes) | Outlet H₂S (ppm) |
|---|---|---|---|
| 0 | 45000 | — | 30 |
| 14 | " | — | 30 |
| 15 | inject air for 30 secs. (0.0513 cu. ft. | 0 | — |

| Elapsed Time (Minutes) | Feed Stock ppm of H$_2$S in Nitrogen | Time After Air Injection (Minutes) | Outlet H$_2$S (ppm) |
|---|---|---|---|
| | of air) | | |
| 24 | 45000 | 9 | 0 |
| 31 | " | 16 | 2 |
| 36 | " | 21 | 4 |
| 47 | " | 32 | 15 |
| 53 | " | 38 | 20 |
| 75 | inject air for 60 secs. (0.103 cu. ft. of air) | 0 | — |
| 84 | 45000 | 9 | 0 |
| 104 | " | 29 | 2 |
| 119 | " | 44 | 12 |
| 128 | " | 53 | 20 |
| 148 | inject air for 10 secs. (0.0171 cu. ft. of air) | 0 | — |
| 153 | 45000 | 5 | 0 |
| 188 | " | 40 | 2 |
| 200 | " | 52 | 20 |
| 272 | inject air for 1 sec. (0.00171 cu. ft. of air) | 0 | — |
| 277 | 45000 | 5 | 0 |
| 287 | " | 15 | 2 |
| 292 | " | 20 | 6 |
| 312 | " | 40 | 30 |

The above table demonstrates that the iron oxide particles without oxygen injection could not scavenge the high concentration of H$_2$S to a low level. However, as soon as oxygen injection was started, the iron oxide was capable of scavenging the H$_2$S to low levels (2 ppm) for a period of 20 minutes, and the intermittent use of oxygen injection thereafter produced the same result.

EXAMPLE V—INCREASED STABILITY OF REACTION PRODUCTS

Air injection changes the reaction products of the slurry process, as shown by four different types of tests: (1) evolution rate of H$_2$S from slurry treated with 1N H$_2$SO$_4$; (2) equilibrium H$_2$S level above slurry buffered at pH=2; (3) percent of sulfur tied up in iron pyrites; and (4) pH produced by a suspension of washed slurry in distilled water. Each test supports the hypothesis that air-injection in effect catalyzes an H$_2$S-iron oxide reaction that results in iron sulfides that are substantially less soluble in water than those produced in the old patented process.

These tests are here discussed in further detail:

(1) Evolution rate of H$_2$S. The reacted slurry is relatively inert to dilute acid at room temperature. When a sample of slurry is added to 1N H$_2$SO$_4$ and scrubbed with N$_2$ gas for five minutes about 0.3 mg of H$_2$S will be evolved per ml of slurry. With the originally patented process, for slurry reacted in the field in the absence of air, the amount of H$_2$S evolved when treated with 1N H$_2$SO$_4$ will be about 20 mg, some 67 times greater. That the test samples were comparable in total acid soluble sulfides of all types was demonstrated by this: when the air-injected sample mixed with H$_2$SO$_4$ was heated almost to boiling, then H$_2$S was released in amounts comparable to that released from a sample of the non-air injected reacted slurry.

(2) Equilibrium H$_2$S level (EPA test protocol): Virtually no H$_2$S appears in the headspace above reacted slurry buffered at pH=2 when the slurry is one from the air injected process; when slurry samples from a non-air injected site are tested according to EPA protocol, H$_2$S levels in the range 50-1000 ppm and higher have been measured in the headspace.

(3) Sulfur tied up in pyrites: Reacted slurry from the O'Byrne site (air-injection) had 57% of total sulfur removed tied up in FeS$_2$ (iron pyrite) the only completely inert type of iron sulfide. The remaining sulfur, 43% ended up in other types of iron sulfides soluble only in hot H$_2$SO$_4$. By contrast, reacted slurry from a site without air-injection (Van Pelt, Mich.) had only 40% of the total sulfur tied up in FeS$_2$, and 60% tied up in hot acid-soluble iron sulfides. Thus, the air injection process approximately reversed the percentages of sulfur tied up in iron pyrites and in hot-acid soluble iron sulfides.

(4) pH on suspension of slurry particles; when washed with water: Reacted slurry was filtered, and the collected solids were washed with distilled water. A slurry of 5 g. of the washed solids in 200 ml distilled water was then prepared, and its pH measured with a combination glass electrode. A striking difference of pH was found between that measured for washed air-injection slurry (pH=8.3) and that measured for washed slurry from the old process (pH=9.3).

A theoretical rationale for the improved results with air injection may be proposed as follows: The reaction of hydrogen sulfide with the oxide particles, as above described, produces some FeS along with more stable reaction products. In the absence of oxygen the FeS produced will hydrolyze slightly in distilled water and raise the pH, according to the equation:

$$FeS + H_2O \rightarrow Fe^{+++} + HS^- + OH^-$$

In the presence of oxygen, the following further reactions with hydrogen sulfide may take place:

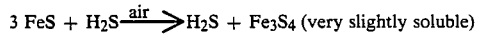
$3\ FeS + H_2S \xrightarrow{air} H_2S + Fe_3S_4$ (very slightly soluble)

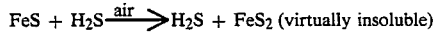
$FeS + H_2S \xrightarrow{air} H_2S + FeS_2$ (virtually insoluble)

This washed slurry will now hydrolyze only to a very small extent in distilled water, with very little increase in pH.

From this disclosure, variations in the presently improved process to serve varying conditions of use will be apparent to persons skilled in the art.

We claim:

1. A process of scavenging hydrogen sulfide from a natural gas stream which comprises:
   (a) introducing and bubbling said stream through a slurry comprising:
      (i) water;
      (ii) iron oxide particles, suspended therein by such bubbling of the gas stream, having a surface area of at least 4 m$^2$/g, a crystalline phase portion of Fe$_3$O$_4$, an amorphous Fe$_2$O$_3$ phase, and an Fe+++ content intermediate to that for pure standards of Fe$_2$O$_3$ and Fe$_3$O$_4$; and
      (iii) a buffering additive including a sulfite;
   (b) reacting substantially the hydrogen sulfide in said gas stream with said iron oxide particles;
   (c) monitoring the outlet gas for hydrogen sulfide content; and
   (d) discontinuing the introduction of said gas stream when the hydrogen sulfide level in the outlet gas reaches a maximum allowable;

whereby said sulfite additive lessens foaming of the slurry, aids in maintaining said particles suspended therein by such bubbling, avoids caking of the particles attendant to such reacting step, maintains favorably high pH throughout the reaction and delays reaching such maximum allowable outlet gas level.

2. The process defined in claim 1 wherein the additive comprises sodium sulfite.

3. The process defined in claim 2 wherein the level of sodium sulfite present in the slurry is not less than 3 pounds per barrel throughout the process.

4. The process defined in claim 2 together with a step of maintaining the quantity of said additive in the slurry throughout the process at a level no less than one pound per barrel.

5. The process as defined in claim 1, wherein one of the products of so reacting the hydrogen sulfide in the gas stream is FeS, together with the added steps of (e) injecting, either continuously or intermittently, oxygen into said gas stream prior to its introduction into the slurry; and (f) further reacting the said reactive product FeS with such injected oxygen to form the more stable products $FeS_2$ and/or $Fe_3S_4$.

6. The process defined in claim 5, wherein the amount of oxygen so injected is of the order of one cubic foot of oxygen for each 1,000 cubic feet of gas to be scavenged.

* * * * *

UNITED STATES PATENT AND TRADEMARK OFFICE
CERTIFICATE OF CORRECTION

PATENT NO. : 4,835,043

DATED : May 30, 1989

INVENTOR(S) : Irwin Fox and Alvin Samuels

It is certified that error appears in the above-identified patent and that said Letters Patent is hereby corrected as shown below:

Column 1, line 11, delete "06/818,262" and substitute ---06/818,282---

Signed and Sealed this

Thirteenth Day of February, 1990

Attest:

JEFFREY M. SAMUELS

Attesting Officer

Acting Commissioner of Patents and Trademarks